1 X OBJECTIVE FOR PROJECTION PRINTING

[72] Inventor: Kenichi Harada, Tokyo, Japan
[73] Assignee: Olympus Optical Co., Ltd., Tokyo, Japan
[22] Filed: Jan. 29, 1971
[21] Appl. No.: 110,810

[52] U.S. Cl. .................................................. 350/214
[51] Int. Cl. ............................................ G02b 9/64
[58] Field of Search ..................................... 350/214

[56] References Cited

UNITED STATES PATENTS 3,504,961  4/1970  Hoogland et al. .......... 350/214
2,481,639  9/1949  Altman et al. .......... 350/214 X Primary Examiner—John K. Corbin
Attorney—Kurt Kelman

[57] ABSTRACT

1 x objective for projection printing having a high resolving power. The objective consists of a forward and a rearward lens system identical to each other but arranged in symmetry with respect to a diaphragm located therebetween. Each of the lens systems comprises first to seventh lens components beginning at the side of the diaphragm and each of the lens components consists of a single lens element. In order to improve the aberrations of the objective, the first lens component is a positive lens element and the second lens component is a positive meniscus with its convex surfaces directed to the diaphragm, the third lens component being a negative meniscus with its convex surface directed to the diaphragm, the fourth lens component being a negative meniscus with its concave surfaces directed to the diaphragm while the fifth lens component is a positive lens element with one of its surfaces having a greater curvature than that of the other surface being concave toward the diaphragm and each of the sixth and seventh lens components is a positive lens element. Each of the lens systems satisfies the following conditions:

$$0.2f < d_7 + d_8 + d_9 < 0.45f \quad (1)$$

$$0.12f < Ad_6 < 0.4f \quad (2)$$

$$-0.45f r_7 < -0.25f \quad (3)$$

$$0.33f < Ar_6 < 0.53f \quad (4)$$

where:

$f$ = the focal length of each of the lens systems $d_i$ ($i = 1, 2, \text{---}$) = the thickness of the lens element or the air gap beginning at the side of the diaphragm.

$r_i$ ($i = 1, 2, \text{---}$) = the radius of curvature of the surfaces of the respective lens element beginning at the side of the diaphragm.

5 Claims, 10 Drawing Figures

INVENTOR
KENICHI HARADA
BY Kurt Kelman
AGENT

SPHERICAL ABERRATION

ASTIGMATISM

LATERAL ABERRATION

R (HEIGHT OF INTERSECTION OF PLANE OF DIAPHRAGM)

3,685,884

1 X OBJECTIVE FOR PROJECTION PRINTING

BACKGROUND OF THE INVENTION

The present invention relates to a 1 x objective for projection printing having a high resolving power.

In the working of wafers of integrated circuits, for example, the so-called contact printing process has been utilized in which a masking original is placed on the surface of a wafer in close contact therewith on which surface a photosensitive emulsion of a high resolving power is applied so that the printing is effected by illuminating the surface of the wafer through the masking original brought in contact with that surface.

Such a process, however, has disadvantages in that the masking originals are rapidly used up thereby requiring new originals and the sharpness of the image formed on the surface of the wafer by the original is greatly deteriorated if the original is not properly brought in close contact with the surface of the wafer thereby lowering the yield of the production of the integrated circuits.

In another process, the original is not brought in contact with the wafer but it is located at a distance from the wafer and an objective having a high resolving power is arranged therebetween so that the pattern of the original is projected onto the surface of the wafer through the objective so that an image of the pattern is formed on the surface of the wafer thereby permitting the pattern to be printed thereon. This process is the so-called projection printing.

The objective used in the projection printing has the magnification of 1 x and the light used in the projection printing is selected to be the monochromatic light of h-line (the wave length of 404.7 m$\mu$) or g-line (the wave length of 435.8 m$\mu$) obtained by a high pressure mercury lamp so that the resolving power of 400 lines/mm or more is obtained over the entire area of the wafer having the diameter of about 50mm.

In general, it is extremely difficult to design a high quality objective for use in the working of wafers of integrated circuits, because it is required to have a very high resolving power while the distortion is significantly compensated for with the compensation for the other aberrations being taken into consideration.

Thus, an objective having a forward and a rearward lens system spaced from each other and identical to each other but arranged in symmetry with respect to a diaphragm located between the lens systems has been proposed for use in the projection printing. In use, an object is placed at a position at which the parallel light ray coming from the diaphragm and passing through the forward lens system converges, i.e., at the front focal point of the forward lens system of the objective so that an image of the magnification of 1 x is formed at the rearward focal point of the rearward lens system. Thus, the distortion is made completely to zero.

On the other hand such an objective has disadvantages in that the axial spherical aberration and the lateral aberration as well as the astigmatism increase twice the amount of those appearing in the respective lens system of the objective when the object is placed at a distance of infinity therefrom.

The present invention aims at avoiding the above described disadvantages of the prior art objective for the projection printing.

SUMMARY OF THE INVENTION

The object of the present invention is to provide a novel and useful 1 x objective for the projection printing which avoids the disadvantages of the prior art objective and which has a high resolving power.

The above object is achieved in accordance with the present invention by the provision of an objective having forward and rearward lens systems identical to each other and located in spaced relationship from each other in symmetry with respect to a diaphragm arranged therebetween, each of the forward and rearward lends systems being characterized by first to seventh lens components spaced from each other beginning at the side of the diaphragm and each consisting of a single lens element, the first lens component being a positive lens element, the second lens component being a positive meniscus with its convex surfaces directed toward the diaphragm, the third lens component being a negative meniscus with its convex surfaces directed toward the diaphragm, the fourth lens component being a negative meniscus with its concave surfaces directed toward the diaphragm, the fifth lens component being a positive lens element with one of its surfaces having a greater curvature than that of the other surface being concave toward the diaphragm, while each of the sixth and seventh lens components is a positive lens element, each of the forward and rearward lens systems satisfying the following conditions:

$$0.2f < d_7 + d_8 + d_9 < 0.45f \quad (1)$$

$$0.12f < d_6 < 0.4f \quad (2)$$

$$-0.45f < r_7 < -0.25f \quad (3)$$

$$0.33f < r_6 < 0.53f \quad (4)$$

where:

$f$ = the focal length of each of the forward and rearward lens systems when parallel light is incident thereto from the side of the diaphragm.

$d_i$ ($i = 1, 2, \text{---}$) = the thickness of the lens element or the air gap between the adjacent two lens elements of the respective lens system beginning at the side of the diaphragm.

$r_i$ ($i = 1, 2, \text{---}$) = the radius of curvature of the respective surface of each of the lens elements of the respective lens system beginning at the side of the diaphragm.

In designing the objective of the present invention, either of the forward or rearward lens system is taken into consideration with the object being assumed as being located in the infinity at the side of the diaphragm, and each of the axial spherical aberration and the lateral aberration and the astigmatism of the respective lens system of the objective as calculated is kept the half the respective aberration desired for the entire system of the objective.

Further, in order to render the non-axial lateral aberration of the objective to be comprised only of the aberrations resulting from the defocusing of the objective effected in consideration of the curvature of image or only of the symmetrical aberrations at the worst so that the aberrations of the objective are sufficiently compensated for, it is necessary that the non-axial lateral aberration of the respective lens system of the objective is made either of extrorse or introrse asymmetric aberration.

Condition (1)

This condition is in order to appropriately compensate for the spherical aberration. If the value $d_7 + d_8 + d_9$ is made greater than $0.45f$, an extreme under correction of the spherical aberration will take place. On the other hand, if the value of $d_7 + d_8 + d_9$ is made less than $0.2f$, an extreme over correction of the spherical aberration will take place. The above described under correction and the over correction can not be compensated for by the lens elements other than those pertaining to the condition (1). Thus, the value of $d_7 + d_8 + d_9$ must be kept within the limits as defined by the condition (1) in the present invention.

Condition (2)

This condition is in order to maintain the astigmatism in an appropriate value while the lateral aberration at the angle of field in the outermost marginal zone is made either of extrorse or introrse asymmetric aberration. If the value of $d_6$ is made less than $0.12f$, then the astigmatism at the angle of field in the outermost marginal zone will become extremely great so that the thus increased astigmatism can not be compensated for by the lens elements other than those pertaining to the condition (2) without increasing the astigmatism at the angle of field in the intermediate annular zone and affecting significantly the curvature of field.

Further, when the value of $d_6$ does not satisfy the condition (2), it is made difficult to render the lateral aberration at the angle of field in the outermost marginal zone to be either of the extrorse or introrse asymmetric aberration.

Since the sense of the variation in the value $d_6$ is the same as that of the variation in the lateral aberration each of the upper light ray and the under light ray at the angle of field in the intermediate annular zone caused by the variation in the value $d_6$, the influence of the variation in the value $d_6$ on the asymmetrical characteristic of the lateral aberration at the angle of field in the intermediate annular zone is rather weak, even though the value $d_6$ exceeds the limits defined in the condition (2). To the contrary, the sense of the variation in the lateral aberration each of the upper light ray and the under light ray at the angle of field in the outermost marginal zone is opposite to that of the variation in the sense of the variation in the value $d_6$ and, therefore, it is made difficult to render the lateral aberration at the angle of field in the outermost marginal zone to be of the asymmetric character, if the value $d_6$ does not satisfy the condition (2). The upper limit enabling the lateral aberration at the angle of field in the outermost marginal zone to be of the asymmetric nature is thus set to $0.4f$. The lower limit of the condition (2) is determined in order to maintain the astigmatism in an appropriate value.

Condition (3)

This condition is in order to render the lateral aberration at the angle of field in the intermediate annular zone to be of the extrorse or introrse asymmetric nature.

Since the sense of the variation in the lateral aberration of the upper light ray at the angle of field in the outermost marginal zone caused by the variation in the value $r_7$ is the same as that of the variation in the lateral aberration of the under light ray at the angle of field in the outermost marginal zone caused by the variation in the value $r_7$, the influence of the variation in the value $r_7$ on the asymmetrical character of the lateral aberration at the angle of field in the outermost marginal zone is rather small, even though the value $r_7$ does not satisfy the condition (3). To the contrary, the sense of the variation in the lateral aberration of the upper light ray at the angle of field in the intermediate annular zone caused by the variation in the value $r_7$ is opposite to that of the variation in the lateral aberration of the under light ray at the angle of field in the intermediate annular zone caused by the variation in the value $r_7$ and, therefore, it is made difficult to maintain the asymmetric character of the lateral aberration at the angle of field in the intermediate annular zone, if the value $r_7$ is made less than $-0.45f$ or if the value $r_7$ exceeds $-0.25f$.

Condition (4)

This condition is in order to appropriately compensate for the curvature of field while the astigmatism at various angles of field is kept substantially constant.

If the value $r_6$ is made less than $0.33f$, the astigmatism at each angle of field increases. Although it is advantageous to reduce the curvature of the surface $r_6$ in order to reduce the astigmatism, it is made difficult to render the other aberrations than the astigmatism, particularly the non-axial lateral aberration to be of the asymmetrical nature by reducing the curvature of the surface $r_6$. Therefore, it is not preferable to extremely reduce the curvature of the surface $r_6$. Thus, the upper limit is set to $0.53f$.

DETAILED DESCRIPTION OF THE PREFERRED EMBODIMENTS

Figure 1:
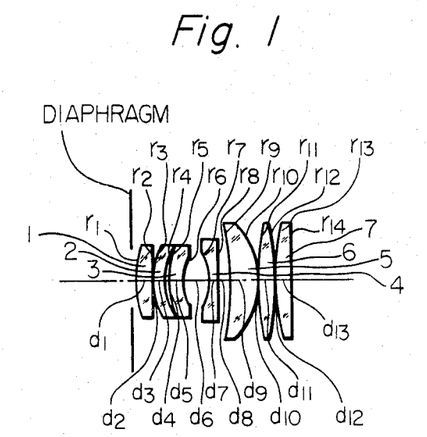
FIG. 1 is a longitudinal sectional view showing one of the lens systems of the objective constructed in accordance with the present invention.
Figure 2:
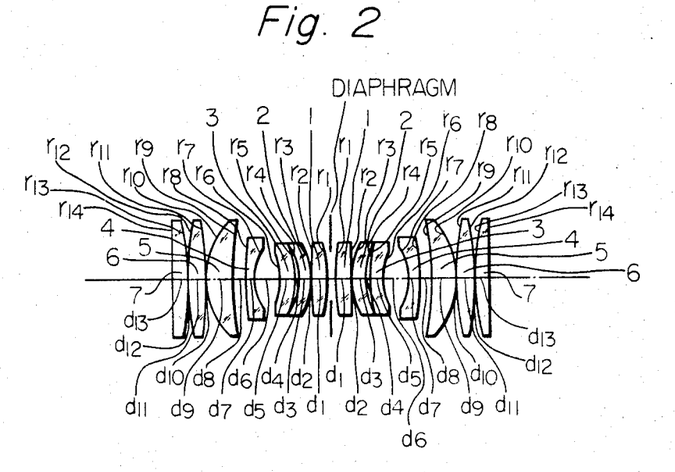
FIG. 2 is a longitudinal view showing the general arrangement of the objective of the present invention.

Referring to FIG. 1, the rearward lens system of the objective which is identical to the front lens system (not shown) but arranged in symmetry thereto with respect to the diaphragm comprises the first to seventh lens components 1 to 7 beginning at the side of the diaphragm. Each of the lens components 1 to 7 consists of a single lens element. FIG. 2 shows the entire system of the objective consisting of the two lens systems identical to each other but located in symmetry with respect to the diaphragm.

Now numerical data of the preferred embodiments of the present invention will be described below in which the symbols $n_i$ ($i = 1, 2, ---$) and $\nu_i$ ($i = 1, 2, --.$) show the refractive index and Abbe number of the respective lens element in either of the lens systems beginning at the side of the diaphragm, respectively, and the refractive index $n_i$ is measured by using the light of g-line (the wave length of 435.8 m$\mu$) and the symbol $S_1$ designates the distance between the diaphragm and the forwardmost surface of the first lens component 1. The aberration curves are shown under the condition that the focal length $f$ of either of the lens system is 169mm, while the curve Y shows the image height (mm).

FIRST EMBODIMENT f = 169mm Relative Aperture F 1:2.6 Maximum Image Height 25mm $S_1 = 6.5$mm

| | | | | | | | | |
|---|---|---|---|---|---|---|---|---|
| $r_1$ | 278.89 | $d_1$ | 15.6 | | | | | |
| $r_2$ | 2356.737 | $d_2$ | 0.26 | | $n_1$ | 1.65609 | $\nu_1$ | 58.3 |
| $r_3$ | 78.545 | $d_3$ | 15.21 | | | | | |
| $r_4$ | $d_4$82.871 | | 5.2 | | $n_2$ | 1.63309 | $\nu_2$ | 60.2 |
| $r_5$ | 133.472 | $d_5$ | 15.6 | | | | | |
| $r_6$ | 72.263 | $d_6$ | 29.9 | | $n_3$ | 1.67248 | $\nu_3$ | 33.8 |
| $r_7$ | −61.443 | $d_7$ | 10.27 | | | | | |
| $r_8$ | −533.146 | $d_8$ | 13.0 | | $n_4$ | 1.77436 | $\nu_4$ | 28.2 |
| $r_9$ | −421.171 | $d_9$ | 30.42 | | | | | |
| $r_{10}$ | −94.297 | $d_{10}$ | 0.26 | | $n_5$ | 1.67253 | $\nu_5$ | 57.2 |
| $r_{11}$ | 382.987 | $d_{11}$ | 20.8 | | | | | |
| $r_{12}$ | −268.875 | $d_{12}$ | 0.26 | | $n_6$ | 1.67253 | $\nu_6$ | 57.2 |
| $r_{13}$ | 256.346 | $d_{13}$ | 16.9 | | | | | |
| $r_{14}$ | ∞ | | | | $n_7$ | 1.67253 | $\nu_7$ | 57.2 |

Figure 3:
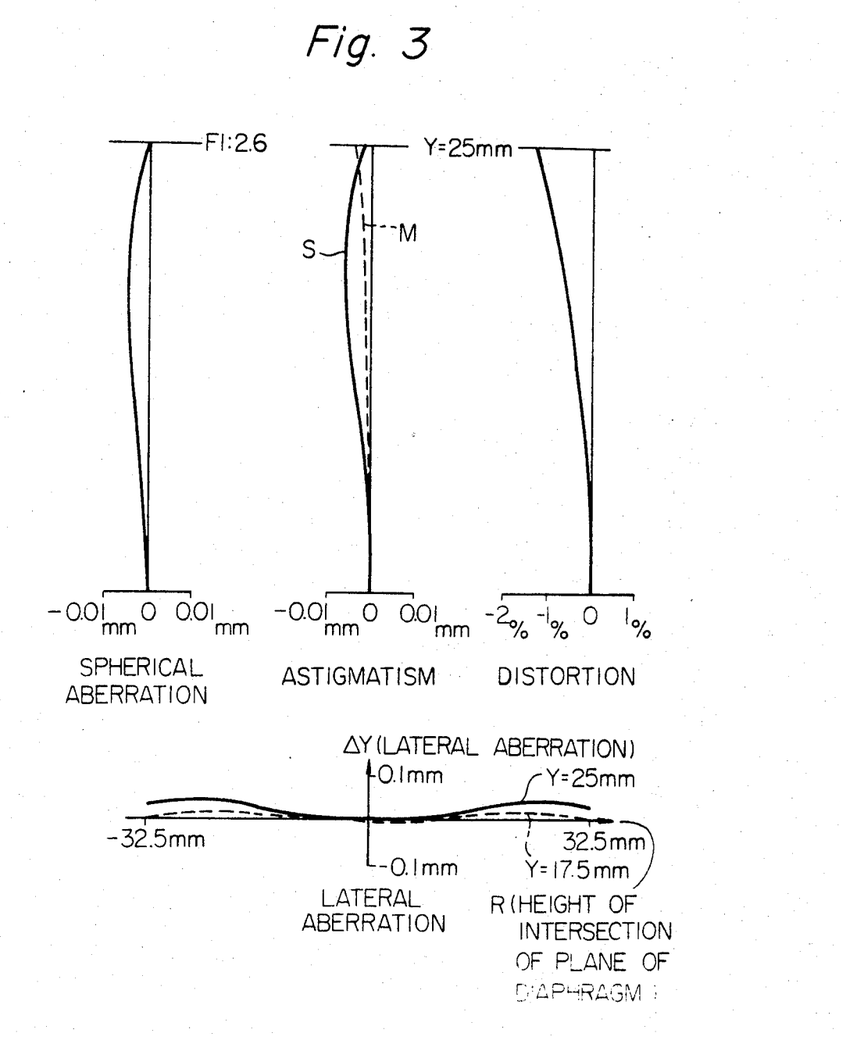
FIG. 3 shows various aberration curves of one of the lens systems of the first embodiment of the present invention.
Figure 4:
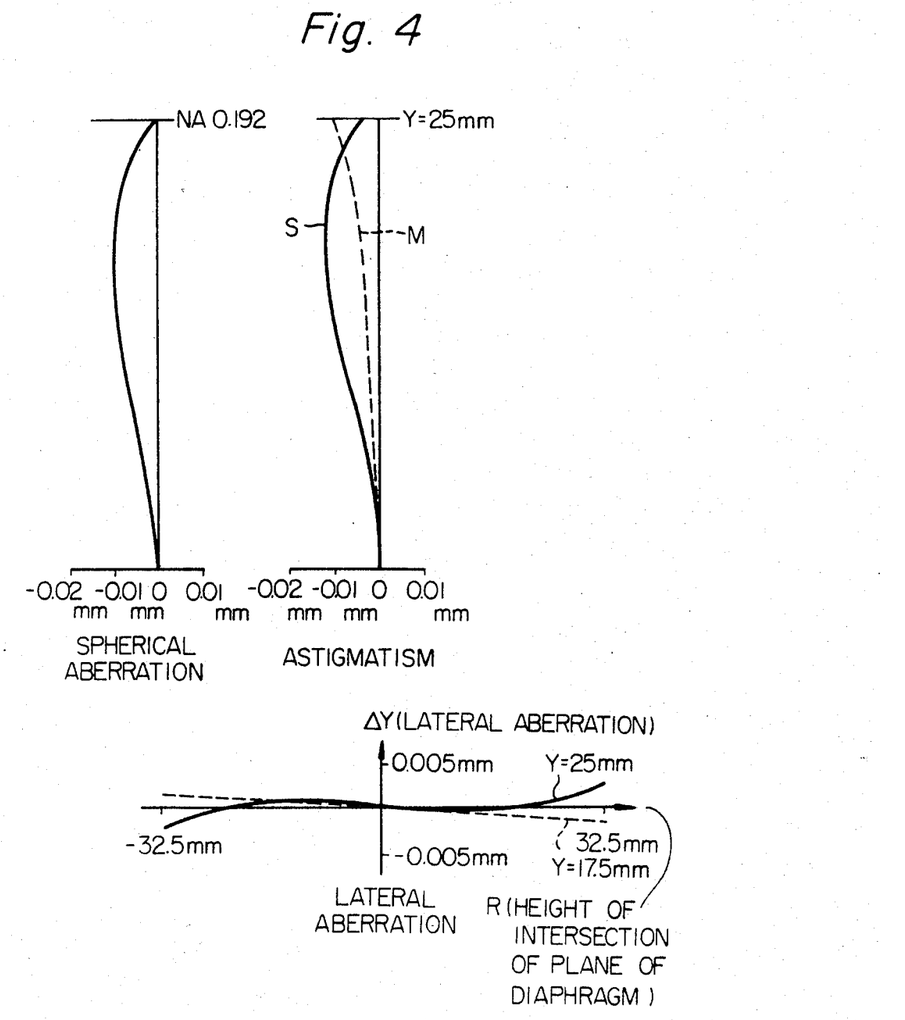
FIG. 4 shows various aberration curves of the entire system of the first embodiment of the present invention.

The aberration curves of either of the lens systems of the first embodiment are shown in FIG. 3, while FIG. 4 shows the aberration curves of the entire system of the first embodiment.

SECOND EMBODIMENT f = 169mm Relative Aperture F 1:2.6 Maximum Image Height 25mm $S_1 = 6.5$mm

| | | | | | | | | |
|---|---|---|---|---|---|---|---|---|
| $r_1$ | 355.03 | $d_1$ | 14.3 | | | | | |
| $r_2$ | −7248.597 | $d_2$ | 0.39 | | $n_1$ | 1.80878 | $\nu_1$ | 47.4 |
| $r_3$ | 104.81 | $d_3$ | 15.6 | | | | | |
| $r_4$ | 155.977 | $d_4$ | 11.92 | | $n_2$ | 1.79194 | $\nu_2$ | 49.5 |
| $r_5$ | 201.7 | $d_5$ | 13.88 | | | | | |
| $r_6$ | 74.832 | $d_6$ | 51.27 | | $n_3$ | 1.77594 | $\nu_3$ | 27.7 |
| $r_7$ | −65.277 | $d_7$ | 19.49 | | | | | |
| $r_8$ | −1523.327 | $d_8$ | 0.13 | | $n_4$ | 1.77594 | $\nu_4$ | 27.7 |
| $r_9$ | −3350.986 | $d_9$ | 45.96 | | | | | |
| $r_{10}$ | −107.584 | $d_{10}$ | 0.39 | | $n_5$ | 1.765 | $\nu_5$ | 44.7 |
| $r_{11}$ | −1991.048 | $d_{11}$ | 20.8 | | | | | |
| $r_{12}$ | −267.028 | $d_{12}$ | 0.39 | | $n_6$ | 1.765 | $\nu_6$ | 44.7 |
| $r_{13}$ | 228.103 | $d_{13}$ | 22.1 | | | | | |
| $r_{14}$ | −1866.648 | | | | $n_7$ | 1.765 | $\nu_7$ | 44.7 |

Figure 5:
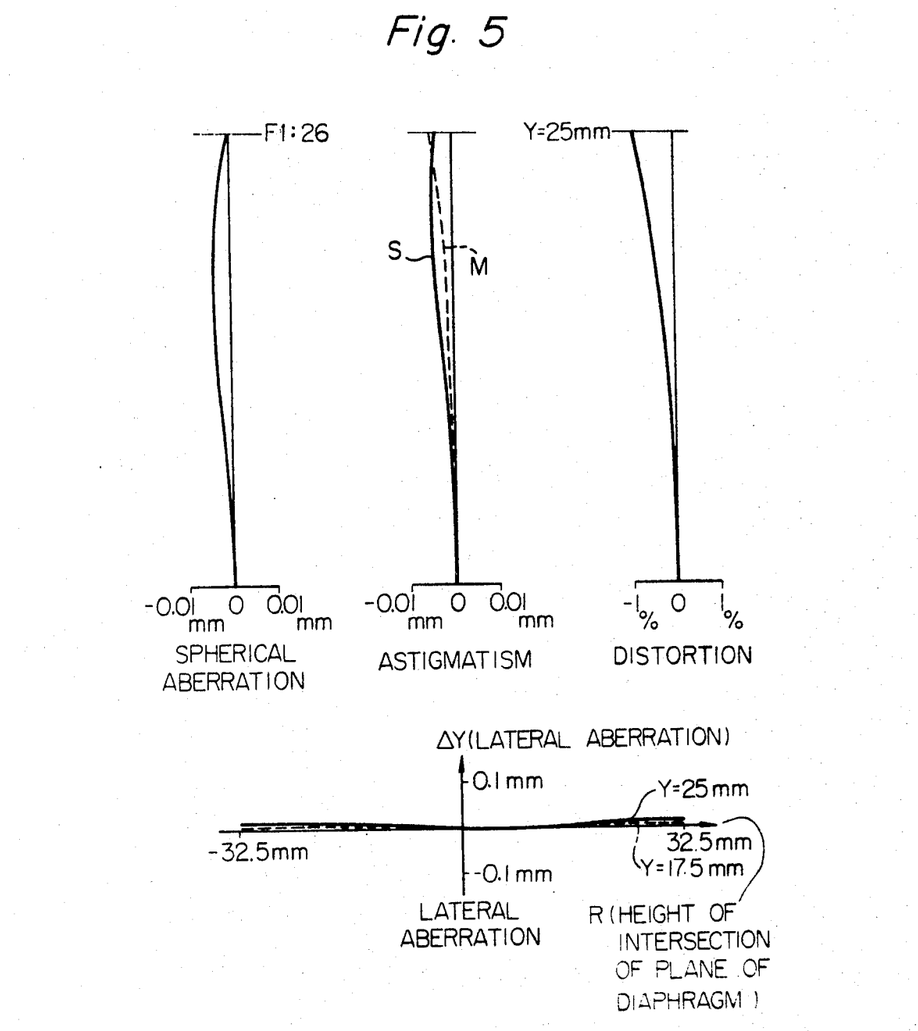
FIG. 5 shows various aberration curves of one of the lens systems of the second embodiment of the present invention.
Figure 6:
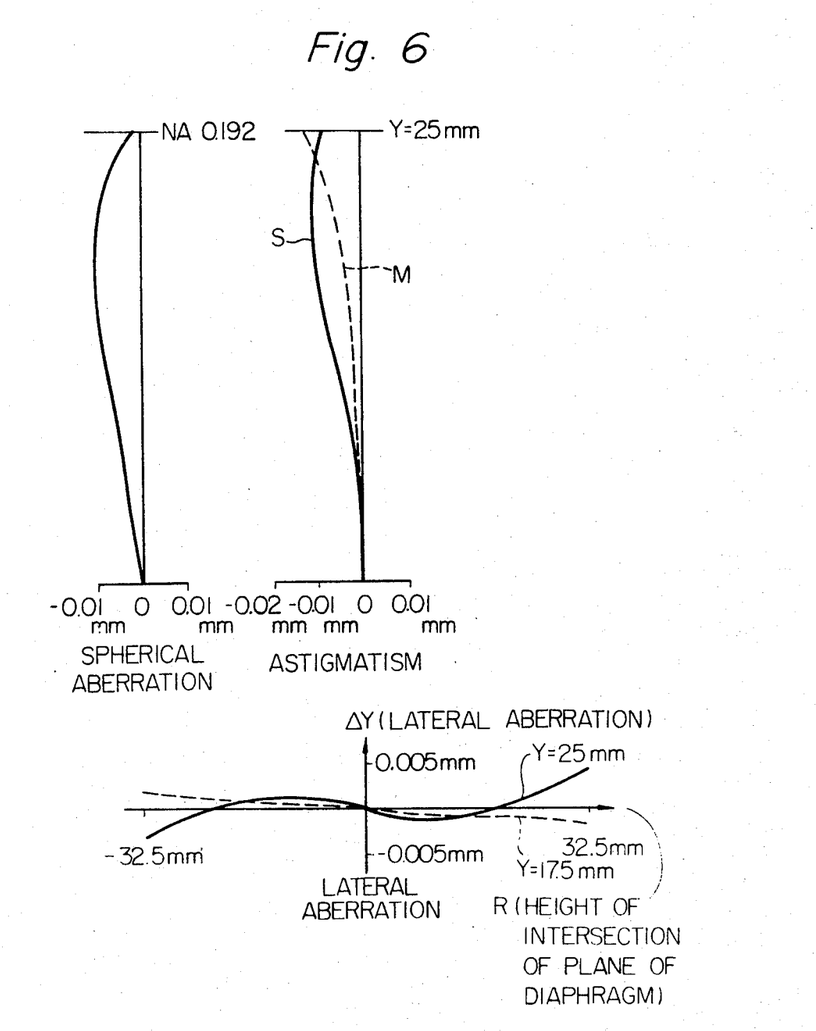
FIG. 6 shows various aberration curves of the entire system of the second embodiment.

FIG. 5 shows the aberration curves of either of the lens systems of the second embodiment, while FIG. 6 shows the aberration curves of the entire system of the second embodiment.

THIRD EMBODIMENT f = 169mm Relative Aperture F 1:2.6 Maximum Image Height 25mm $S_1 = 6.5$mm

| | | | | | | | | |
|---|---|---|---|---|---|---|---|---|
| $r_1$ | 209.937 | $d_1$ | 15.6 | | | | | |
| $r_2$ | ∞ | $d_2$ | 0.26 | | $n_1$ | 1.65609 | $\nu_1$ | 58.3 |
| $r_3$ | 72.887 | $d_3$ | 15.21 | | | | | |
| $r_4$ | 73.224 | $d_4$ | 5.2 | | $n_2$ | 1.63309 | $\nu_2$ | 60.2 |
| $r_5$ | 119.457 | $d_5$ | 15.6 | | | | | |
| $r_6$ | 64.628 | $d_6$ | 29.9 | | $n_3$ | 1.67248 | $\nu_3$ | 33.8 |
| $r_7$ | −60.067 | $d_7$ | 10.27 | | | | | |
| $r_8$ | −806.74 | $d_8$ | 13.0 | | $n_4$ | 1.77436 | $\nu_4$ | 28.2 |
| $r_9$ | −557.99 | $d_9$ | 30.42 | | | | | |
| $r_{10}$ | −91.731 | $d_{10}$ | 0.26 | | $n_5$ | 1.67253 | $\nu_5$ | 57.2 |
| $r_{11}$ | 309.686 | $d_{11}$ | 20.8 | | | | | |
| $r_{12}$ | −287.775 | $d_{12}$ | 0.26 | | $n_6$ | 1.67253 | $\nu_6$ | 57.2 |
| $r_{13}$ | 284.333 | $d_{13}$ | 16.9 | | | | | |
| $r_{14}$ | ∞ | | | | $n_7$ | 1.67253 | $\nu_7$ | 57.2 |

Figure 7:
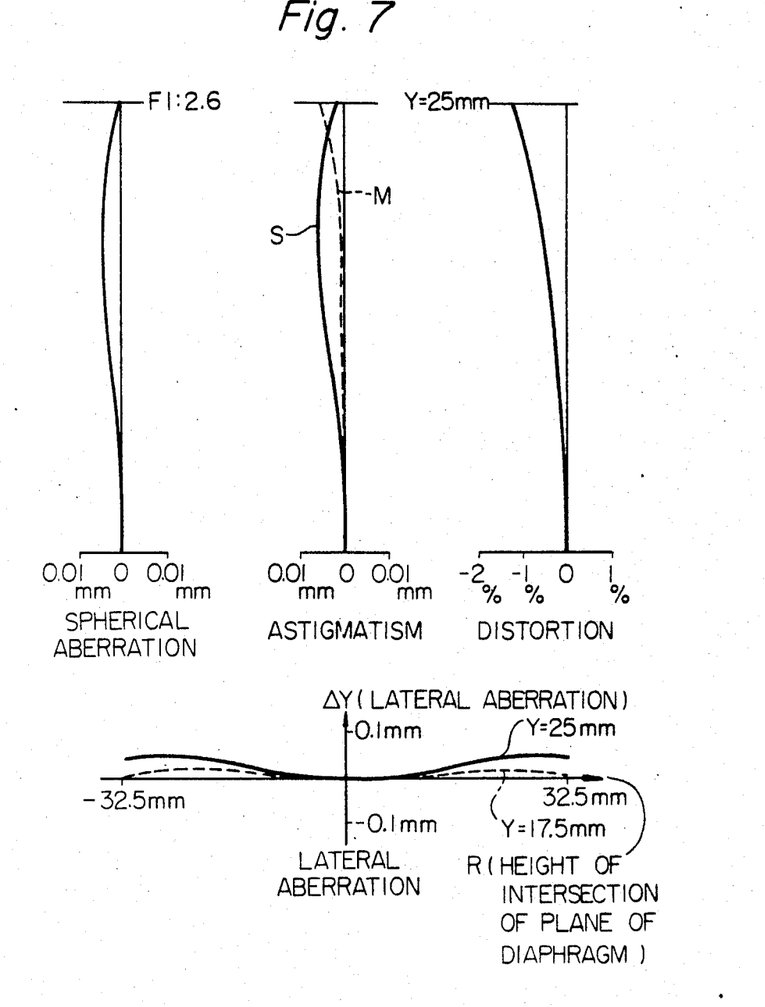
FIG. 7 shows various aberration curves of one of the lens systems of the third embodiment of the present invention.
Figure 8:
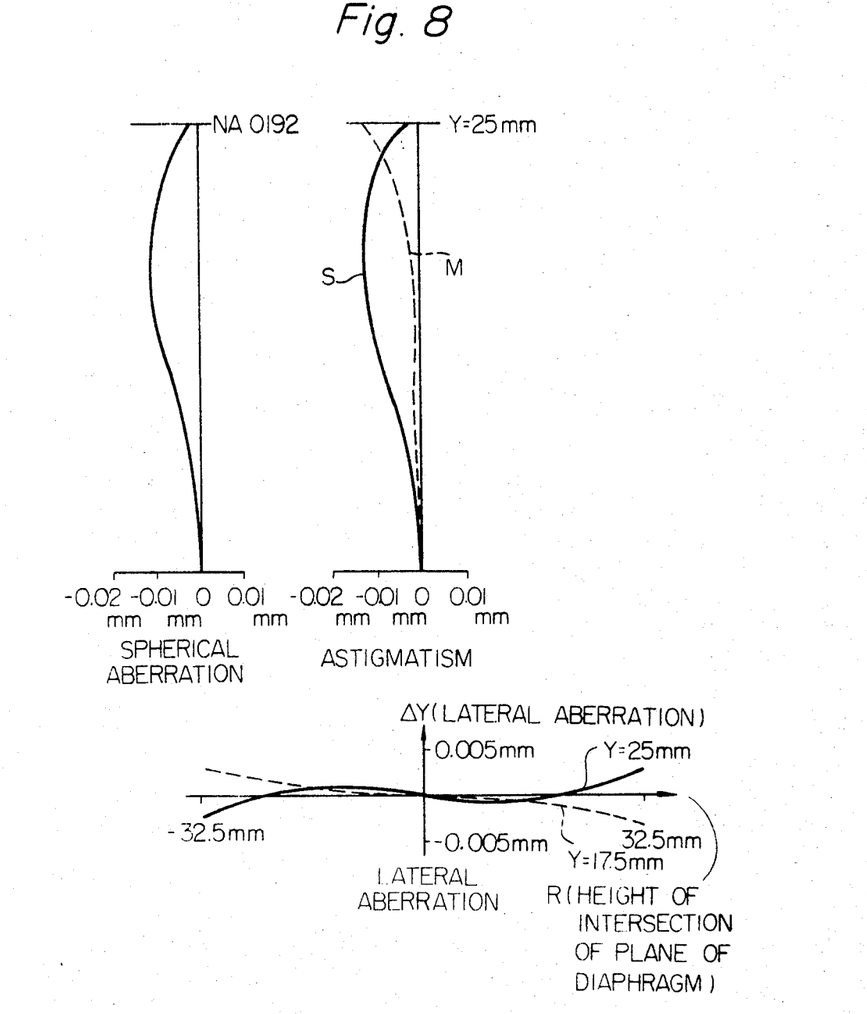
FIG. 8 shows various aberration curves of the entire system of the third embodiment.

FIG. 7 shows the aberration curves of either of the lens system of the third embodiment while the aberration curves of the entire system are shown in FIG. 8.

FOURTH EMBODIMENT f = 169mm Relative Aperture F 1:2.6 Maximum Image Height 25mm $S_1 = 6.5$mm

| | | | | | | | | |
|---|---|---|---|---|---|---|---|---|
| $r_1$ | 269.408 | $d_1$ | 15.6 | | | | | |
| $r_2$ | 7921.127 | $d_2$ | 0.26 | | $n_1$ | 1.65306 | $\nu_1$ | 60.2 |
| $r_3$ | 78.831 | $d_3$ | 15.6 | | | | | |
| $r_4$ | 77.745 | $d_4$ | 5.2 | | $n_2$ | 1.63309 | $\nu_2$ | 60.2 |
| $r_5$ | 135.759 | $d_5$ | 15.6 | | | | | |
| $r_6$ | 76.373 | $d_6$ | 24.7 | | $n_3$ | 1.69992 | $\nu_3$ | 32.1 |
| $r_7$ | −60.886 | $d_7$ | 10.21 | | | | | |
| $r_8$ | −434.159 | $d_8$ | 13.0 | | $n_4$ | 1.77436 | $\nu_4$ | 28.2 |
| $r_9$ | −349.637 | $d_9$ | 30.37 | | | | | |
| $r_{10}$ | −94.461 | $d_{10}$ | 0.26 | | $n_5$ | 1.68446 | $\nu_5$ | 57.3 |
| $r_{11}$ | 345.156 | $d_{11}$ | 20.8 | | | | | |
| $r_{12}$ | −283.099 | $d_{12}$ | 0.26 | | $n_6$ | 1.68446 | $\nu_6$ | 57.3 |
| $r_{13}$ | 286.764 | $d_{13}$ | 15.6 | | | | | |
| $r_{14}$ | −4680.446 | | | | $n_7$ | 1.68446 | $\nu_7$ | 57.3 |

Figure 9:
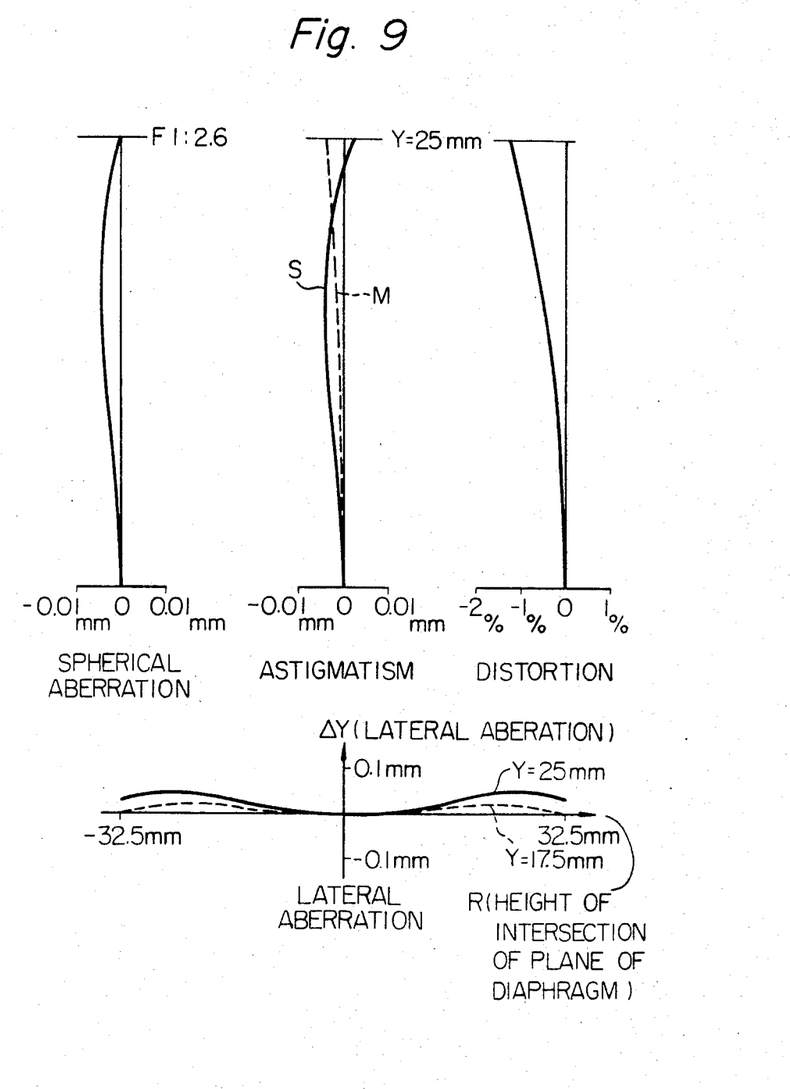
FIG. 9 shows various aberration curves of one of the lens systems of the fourth embodiment of the present invention.
Figure 10:
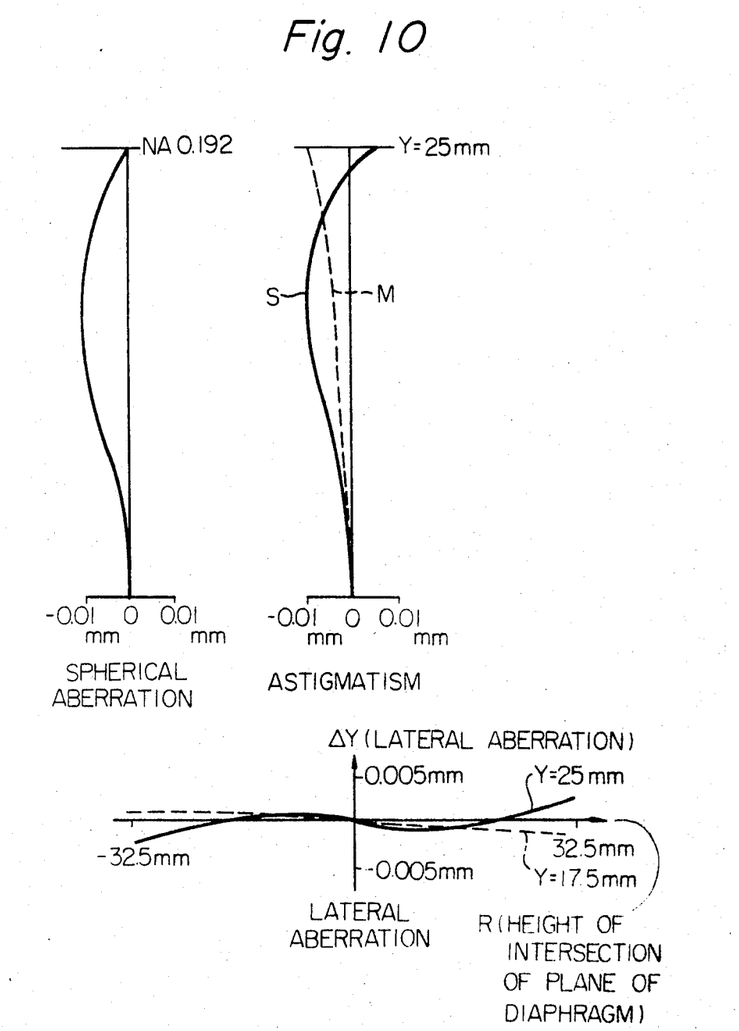
FIG. 10 shows various aberration curves of the entire system of the fourth embodiment.

FIG. 9 shows the aberration curves of either of the lens systems of the fourth embodiment, while the aberration curves of the entire system are shown in FIG. 10.

As is clear from these aberration curves, the present invention provides a high quality 1 x objective for the projection printing.

I claim

1. 1 x objective for projection printing having a high resolving power which consists of a forward and rearward lens system identical to each other and located in spaced relationship from each other in symmetry with respect to a diaphragm arranged therebetween, the improvement comprises the fact that each of said lens systems comprises first to seventh lens components spaced from each other beginning at the side of said diaphragm and each consisting of a single lens element, said first lens component being of a positive lens element, said second lens component being of a positive meniscus with its convex surfaces directed toward said diaphragm, said third lens component being of a negative meniscus with its convex surfaces directed toward said diaphragm, said fourth lens component being of a negative meniscus with its concave surfaces directed toward said diaphragm, said fifth lens component being of a positive lens element with one of its surfaces having a greater curvature than that of the other surface being concave toward said diaphragm, while each of said sixth and seventh lens components is of a positive lens element each of said forward and rearward lens systems satisfying the following conditions:

$$0.2f < d_7 + d_8 + d_9 < 0.45f \quad (1)$$

$$0.12f < d_8 < 0.4f \quad (2)$$

$$-0.45f < r_7 < -0.25f \quad (3)$$

$$0.33f < r_6 < 0.53f \quad (4)$$

where f = the focal length of each of the forward and rearward lens systems when a parallel light ray is incident to each of the lens systems from the side of the diaphragm.

$d_i$ (i = 1, 2, ——) = the thickness of the lens element or the air gap between the adjacent two lens elements of the respective lens systems beginning at the side of the diaphragm.

$r_i$ (i = 1, 2, ——) = the radius of the curvature of the respective surface of each of the lens elements of the respective lens system beginning at the side of the diaphragm.

2. 1 x objective according to claim 1 wherein each of said lens systems satisfies the following numerical data:

| | | | | | | | |
|---|---|---|---|---|---|---|---|
| $r_1$ | 278.89 | $d_1$ | 15.6 | | | | |
| $r_2$ | 2356.757 | $d_2$ | 0.26 | $n_1$ | 1.65609 | $\delta_1$ | 58.3 |
| $r_3$ | $d_3$78.545 | | 15.21 | | | | |
| $r_4$ | 82.871 | $d_4$ | 5.2 | $n_2$ | 1.63309 | $\delta_2$ | 60.2 |
| $r_5$ | 133.472 | $d_5$ | 15.6 | | | | |
| $r_6$ | 72.263 | $d_6$ | 29.9 | $n_3$ | 1.67248 | $\delta_3$ | 33.8 |
| $r_7$ | −61.443 | $d_7$ | 10.27 | | | | |
| $r_8$ | −533.146 | $d_8$ | 13.0 | $n_4$ | 1.77436 | $\delta_4$ | 28.2 |
| $r_9$ | −421.171 | $d_9$ | 30.42 | | | | |
| $r_{10}$ | −94.297 | $d_{10}$ | 0.26 | $n_5$ | 1.67253 | $\delta_5$ | 57.2 |
| $r_{11}$ | 382.987 | $d_{11}$ | 20.8 | | | | |
| $r_{12}$ | −268.875 | $d_{12}$ | 0.26 | $n_6$ | 1.67253 | $\delta_6$ | 57.2 |
| $r_{13}$ | 256.346 | $d_{13}$ | 16.9 | | | | |
| $r_{14}$ | ∞ | | | $n_7$ | 1.67253 | $\delta_7$ | 57.2 | where:

$n_i$ (i + 1, 2, ——) = the refractive index of the respective lens element with respect to g-line (435.8 m$\mu$) beginning at the side of the diaphragm.

$\partial_i$ (i = 1, 2, ——) = Abbe number of the respective lens element beginning at the side of the diaphragm.

3. 1 x objective according to claim 1 wherein each of said lens systems satisfies the following numerical data:

| | | | | | | | |
|---|---|---|---|---|---|---|---|
| $r_1$ | 355.03 | $d_1$ | 14.3 | | | | |
| $r_2$ | −7248.597 | $d_2$ | 0.39 | $n_1$ | 1.80878 | $\delta_1$ | 47.4 |
| $r_3$ | 104.81 | $d_3$ | 15.6 | | | | |
| $r_4$ | 155.977 | $d_4$ | 11.92 | $n_2$ | 1.79194 | $\delta_2$ | 49.5 |
| $r_5$ | 201.7 | $d_5$ | 13.88 | | | | |
| $r_6$ | 74.832 | $d_6$ | 51.27 | $n_3$ | 1.77594 | $\delta_3$ | 27.7 |
| $r_7$ | −65.277 | $d_7$ | 19.49 | | | | |
| $r_8$ | −1523.327 | $d_8$ | 0.13 | $n_4$ | 1.77594 | $\delta_4$ | 27.7 |
| $r_9$ | −3350.986 | $d_9$ | 45.96 | | | | |
| $r_{10}$ | −107.584 | $d_{10}$ | 0.39 | $n_5$ | 1.765 | $\delta_5$ | 44.7 |
| $r_{11}$ | −1991.048 | $d_{11}$ | 20.8 | | | | |
| $r_{12}$ | −267.028 | $d_{12}$ | 0.39 | $n_6$ | 1.765 | $\delta_6$ | 44.7 |
| $r_{13}$ | 228.103 | $d_{13}$ | 22.1 | | | | |
| $r_{14}$ | −1866.648 | | | $n_7$ | 1.765 | $\delta_7$ | 44.7 | where:

$n_i$ (i = 1, 2, ——) = the refractive index of the respective lens element with respect to g-line (435.8 m$\mu$) beginning at the side of the diaphragm.

$\partial_i$ (i = 1, 2, ——) = Abbe number of the number of the respective lens element beginning at the side of the diaphragm.

4. 1 x objective according to claim 1, wherein each of said lens systems satisfies the following numerical data:

| | | | | | | | |
|---|---|---|---|---|---|---|---|
| $r_1$ | 209.937 | $d_1$ | 15.6 | | | | |
| $r_2$ | ∞ | $d_2$ | 0.26 | $n_1$ | 1.65607 | $\delta_1$ | 58.3 |
| $r_3$ | 72.887 | $d_3$ | 15.21 | | | | |
| $r_4$ | 73.224 | $d_4$ | 5.2 | $n_2$ | 1.63309 | $\delta_2$ | 60.2 |
| $r_5$ | 119.457 | $d_5$ | 15.6 | | | | |
| $r_6$ | 64.628 | $d_6$ | 29.9 | $n_3$ | 1.67248 | $\delta_3$ | 33.8 |
| $r_7$ | −60.067 | $d_7$ | 10.27 | | | | |
| $r_8$ | −806.74 | $d_8$ | 13.0 | $n_4$ | 1.77436 | $\delta_4$ | 28.2 |
| $r_9$ | −557.99 | $d_9$ | 30.42 | | | | |
| $r_{10}$ | −91.731 | $d_{10}$ | 0.26 | $n_5$ | 1.67253 | $\delta_5$ | 57.2 |
| $r_{11}$ | 309.686 | $d_{11}$ | 20.8 | | | | |
| $r_{12}$ | −287.775 | $d_{12}$ | 0.26 | $n_6$ | 1.67253 | $\delta_6$ | 57.2 |
| $r_{13}$ | 284.333 | $d_{13}$ | 16.9 | | | | |
| $r_{14}$ | ∞ | | | $n_7$ | 1.67253 | $\delta_7$ | 57.2 | where:

$n_i$ (i = 1, 2, ——) = the refractive index of the respective lens element with respect to g-line (435.8 m$\mu$) beginning at the side of the diaphragm.

$\partial_i$ (i = 1, 2, ——) = Abbe number of the respective lens element beginning at the side of the diaphragm.

5. 1 x objective according to claim 1, wherein each of said lens systems satisfies the following numerical data:

| | | | | | | | |
|---|---|---|---|---|---|---|---|
| $r_1$ | 269.408 | $d_1$ | 15.6 | | | | |
| $r_2$ | 7921.127 | $d_2$ | 0.26 | $n_1$ | 1.65306 | $\delta_1$ | 60.2 |
| $r_3$ | 78.831 | $d_3$ | 15.6 | | | | |
| $r_4$ | 77.745 | $d_4$ | 5.2 | $n_2$ | 1.63309 | $\delta_2$ | 60.2 |
| $r_5$ | 135.759 | $d_5$ | 15.6 | | | | |
| $r_6$ | 76.373 | $d_6$ | 24.7 | $n_3$ | 1.69992 | $\delta_3$ | 32.1 |
| $r_7$ | −60.886 | $d_7$ | 10.21 | | | | |
| $r_8$ | −434.159 | $d_8$ | 13.0 | $n_4$ | 1.77436 | $\delta_4$ | 28.2 |
| $r_9$ | −349.637 | $d_9$ | 30.37 | | | | |
| $r_{10}$ | −94.461 | $d_{10}$ | 0.26 | $n_5$ | 1.68446 | $\delta_5$ | 57.3 |
| $r_{11}$ | 345.156 | $d_{11}$ | 20.8 | | | | |
| $r_{12}$ | −283.099 | $d_{12}$ | 0.26 | $n_6$ | 1.68446 | $\delta_6$ | 57.3 |
| $r_{13}$ | 286.764 | $d_{13}$ | 15.6 | | | | |
| $r_{14}$ | −4680.446 | | | $n_7$ | 1.68446 | $\delta_7$ | 57.3 | where:

$N_i$ (i = 1, 2, ——) = the refractive index of the respective lens element with respect to g-line (435.8 m$\mu$) beginning at the side of the diaphragm.

$\partial_i$ (i = 1, 2, ——) = Abbe number of the respective lens element beginning at the side of the diaphragm.

* * * * *